United States Patent [19]

Swaroop

[11] 4,444,827
[45] Apr. 24, 1984

[54] OPAQUE LAMINATE SHEET STRUCTURE

[75] Inventor: Nareshwar Swaroop, Mount Vernon, Ohio

[73] Assignee: Ludlow Corporation, Needham Heights, Mass.

[21] Appl. No.: 391,525

[22] Filed: Jun. 24, 1982

[51] Int. Cl.³ .................... B32B 15/08; B32B 27/08; B65D 65/40
[52] U.S. Cl. .................... 428/216; 428/516; 428/520; 428/408; 428/913; 206/455; 383/109; 493/189; 493/217
[58] Field of Search .............. 428/516, 520, 216, 913, 428/408

[56] References Cited

U.S. PATENT DOCUMENTS

| 4,086,383 | 4/1978 | Yamano et al. | 428/516 X |
| 4,151,318 | 4/1979 | Marshall | 428/516 X |
| 4,258,848 | 3/1981 | Akao et al. | 428/516 X |
| 4,356,221 | 10/1982 | Anthony et al. | 428/516 X |

*Primary Examiner*—P. Ives
*Attorney, Agent, or Firm*—David G. Conlin; Andrew F. Kehoe

[57] ABSTRACT

An improved, tough, opaque laminate structure, particularly useful for incorporation into packaging for light-sensitive photographic products. The laminate comprises a polyisobutylene-modified, high-density polyethylene layer which is sandwiched between two layers of linear low density or linear medium density polyethylene.

7 Claims, 1 Drawing Figure

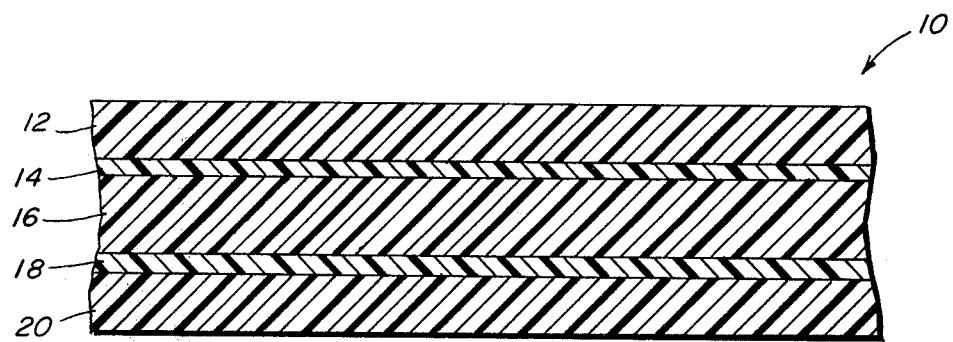

OPAQUE LAMINATE SHEET STRUCTURE

BACKGROUND OF THE INVENTION

This invention relates to an improved, opaque, packaging laminate.

The laminate of the invention is useful for photographic bags, for example the bag described in U.S. Pat. No. 3,647,134 to Carnevalino. It is intended to replace or be the functional equivalent of laminates which are presently used and which are formed of plastic layers laminated together at substantial angles, i.e. cross-laminated such that the machine direction is different for each sheet. The cross-laminated aspect of the sheet yields good physical properties which have been difficult to meet without increasing the thickness or the cost of the product. As will be realized by those skilled in the art, the pigment-loading of the polymer required to achieve opacity poses a substantial detriment to the maintenance of a proper level of film strength.

SUMMARY OF THE INVENTION

It is a principal object of the invention to provide a tough opaque film formed of polyolefinic materials.

It is a further object of the invention to provide a film having tensile strength, elongation, tear and impact resistance similar to competitive crosslaminated materials but with somewhat more stiffness, a desirable characteristic in some packaging operations.

Other objects of the invention will be obvious to those skilled in the art on their reading of this disclosure.

The above objects have been substantially achieved by the construction of a laminate which is formed of the following sequence of layers.

1. A primarily linear, low-density (or linear, medium density) polyethylene containing about 7-8 percent of carbon black. (In the usual situation, the carbon black will be carried into the composition as about a 30% concentration in low density polyethylene. Thus, low-density polyethylene forms about 16% of the polymer in this film.)
2. A laminating resin layer selected from the group of a low density polyethylene, a copolymer of low density polyethylene, a two component thermosetting adhesive or a medium density polyethylene.
3. A rubber-modified polyethylene composition comprising a major portion of high density polyethylene modified with a synthetic rubber, preferably polyisobutylene. A suitable raw material is sold by Allied Corp. under the trade designation Allied 2201. The material is conveniently combined with about 16-17 percent of a pigment concentrate in low density polyethylene, including black pigment and that polymer used to carry the pigment, and conveniently comprises
   57 high density polyethylene
   27 isobutylene
   12 low density polyethylene
   5 black pigment
4. Laminating resin layer selected from the group of a low density polyethylene, a copolymer of low density polyethylene, a two component thermosetting adhesive or a medium density polyethylene.
5. Another layer of linear low or medium density polyethylene.

Thus the more tear-resistant and puncture resistant film sandwiches the strong, but relatively easy to tear, interior film.

Depending on the precise nature of product to be manufactured from the laminate, the layers can be of various thicknesses.

In situations, where it is desirable to reduce the stiffness of the product somewhat, it is possible to use polyethylene copolymers such as polyethylene vinyl acetate and ethylene acrylic acid polymer as the laminating resin.

In other situations, where it is desirable to have a higher thermal resistance, it is possible to use two-component thermosetting adhesives as the laminating resin.

Typical constructions A, B, and C are:

| Layer | A Inches Thickness | B Inches Thickness | C Inches Thickness |
|---|---|---|---|
| 1 | 0.002 | 0.002 (low linear) | 0.002 |
| 2 | 0.0005 | 0.00075 | 0.0005 |
| 3 | 0.003 | 0.003 | 0.002 |
| 4 | 0.0005 | 0.00075 | 0.0005 |
| 5 | 0.001 (low linear) | 0.001 | 0.002 |

Unless otherwise specified, the "linear polyethylene" is linear medium density polyethylene.

However, these typical constructions may be modified substantially. For preferred products, it is desirable to use a laminating resin which has a stiffness between the relatively high-modulus and black-bearing layers.

In practice, these laminates are usually adhered to a paper or other covering which facilitates handling and printing.

The melt indices of linear low or medium density polymers are advantageously about 1.0 and the nominal densities are 0.920 and 0.930, respectively.

Opacity, as used herein, indicates that 99.95 percent of light will not be transmitted through a sheet.

ILLUSTRATIVE EXAMPLE OF THE INVENTION

In the application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

The drawing is a schematic section of a laminate 10 prepared according to the invention. Layers 12 and 20 are linear low density (or medium density) polyethylene, diluted somewhat by a carbon-black concentrate with which it has been blended. Layers 14 are of medium density polyethylene laminating resins and Layer 16 is the rubber-modified polyethylene, all as described elsewhere in this specification.

Example A, described above, was given a physical abuse test and performed as follows. Values are given for machine direction (MD) and crossdirection (CD).

| Tensile Strength, lbs per inch: | 20.7 (MD) |
| --- | --- |
| | 12.5 (CD) |
| Elongation, percent: | 400+ (MD) |
| | 400+ (CD) |
| Tear Strength (grams) | 554 (MD) |
| | 3200+ (CD) |
| Stiffness (mg.) | 143.1 (MD) |
| | 171.6 (CD) |
| Optical density | 4.495 |
| Impact, (Spencer*,), grams | 82 |

*a modified impact strength test, the results of which correlate well with puncture resistance.

In general, it is usually preferred that the laminates of the invention have tensile strength of about 15 or more; elongations of about 400 or more; tear strength of about 500 or more; a minimum stiffness of about 130 mg. and an impact value of 80 or more. These values are measured on a seven-mil composite laminate.

It is also to be understood that the following claims are intended to cover all of the generic and specific features of the invention herein described and all statements of the scope of the invention which might be said to fall therebetween.

What is claimed is:

1. An opaque laminate sheet structure free of cross-lamination structure and comprising a rubber-modified polyolefin layer sandwiched between two carbon-black bearing layers of linear low density, or linear medium density, polyethylene wherein each layer of linear, low density polyethylene or linear, medium density polyethylene is laminated to said rubber-modified polyethylene with a coating of a laminating resin selected from the group of a low density polyethylene, a copolymer of polyethylene with vinyl acetate or acrylic acid, a two component thermosetting adhesive and a medium density polyethylene.

2. An opaque laminate as defined in claim 1, wherein said laminating resin is low density polyethylene or a copolymer of low density polyethylene with vinyl acetate or acrylic acid.

3. An opaque laminate as defined in claim 1, wherein said laminating resin is medium density polyethylene.

4. A laminate as defined in claims 1, 2 or 3 wherein said rubber-modified polyolefin layer is polyisobutylene-modified, high-density polyethylene.

5. A laminate as defined in claims 1, 2, or 3 wherein said rubber-modified layer is from about 0.0018 to about 0.003 inches thick; wherein said laminating resin layers are from about 0.0005 to about 0.00075 inches thick; and wherein said linear low-density polyethylene is about 0.001 to about 0.002 inches thick.

6. A laminate as defined in claims 1, 2 or 3 wherein said rubber-modified polyolefin layer is polyisobutylene-modified, high-density polyethylene of from about 0.0018 to about 0.003 inches thick; wherein said laminating resin layers are from about 0.0005 to about 0.00075 inches thick; wherein said linear low density, or said linear medium density, polyethylene is about 0.001 to about 0.002 inches thick.

7. A laminate as defined in claim 6, about 0.007 inches thick and having the following properties:

| Opacity | 99.95 percent of light will not be transmitted |
| --- | --- |
| Tensile strength | 15 lbs per unit |
| Minimum elongation | 400 percent |
| Minimum tear strength | 500 grams |
| Minimum stiffness | 130 mg |
| Impact value | 80 or more. |

* * * * *